United States Patent [19]
Rose

[11] 3,745,998
[45] July 17, 1973

[54] VACUUM FORMED SUPPORT STRUCTURES AND IMMOBILIZER DEVICES

[75] Inventor: Frank L. Rose, New Fairfield, Conn.

[73] Assignee: Bio-Medical Systems, Inc., Danbury, Conn.

[22] Filed: Jan. 6, 1971

[21] Appl. No.: 104,410

Related U.S. Application Data

[63] Continuation-in-part of Ser. No. 817,486, April 18, 1969, abandoned.

[52] U.S. Cl. ............................ 128/89 R, 128/87 R
[51] Int. Cl. .............................................. A61f 5/04
[58] Field of Search ................. 128/89, 87, DIG. 20, 128/595, 30.2

[56] References Cited
UNITED STATES PATENTS

| | | | |
|---|---|---|---|
| 2,749,910 | 6/1956 | Faulconer, Jr. | 128/30.2 |
| 3,325,920 | 6/1967 | Werner et al. | 128/595 UX |
| 3,075,522 | 1/1963 | Cullen et al. | 128/87 |
| 2,387,192 | 10/1945 | Straits | 128/DIG. 20 |
| 3,212,497 | 10/1965 | Dickinson | 128/DIG. 20 |
| 2,531,074 | 11/1950 | Miller | 128/DIG. 20 |
| 3,091,237 | 5/1963 | Skinner | 128/DIG. 20 |
| 2,651,302 | 9/1953 | Berry | 128/DIG. 20 |
| 3,245,405 | 4/1966 | Gardner | 128/87 |
| 3,214,221 | 10/1965 | Finnegan | 302/17 |

FOREIGN PATENTS OR APPLICATIONS

| | | | |
|---|---|---|---|
| 1,215,859 | 5/1966 | Germany | 128/87 |
| 440,113 | 8/1925 | Germany | 128/DIG. 20 |
| 1,535,491 | 7/1968 | France | 128/DIG. 20 |

Primary Examiner—Richard A. Gaudet
Assistant Examiner—J. Yasko
Attorney—Robert H. Ware

[57] ABSTRACT

Rigidifiable and collapsible support structures are utilized as orthopedic casts and slings, litters, and stretchers, cervical collars and related devices, with two conditions or modes of operation, a collapsed condition in which they are easily molded and formed to conform to the contours of the human body or other object to be supported or enclosed, and a rigidified condition in which they are stiffly and rigidly maintained in their molded shape over long periods of time to provide the desired supporting function. Large numbers of extremely lightweight foamed or hollow bodies of polymer material, are enclosed in flexible sealed enclosures formed of resilient stretchable plastic film, capable of being evacuated to low internal pressures relative to the surrounding atmospheric pressure, and foraminous distributor units serve to retain the lightweight polymer filler particles within the enclosure while permitting the withdrawal of gas therefrom to evacuate the enclosure, permitting atmospheric pressure to compress the entire unit and retain it rigidly in the molded position desired.

13 Claims, 25 Drawing Figures

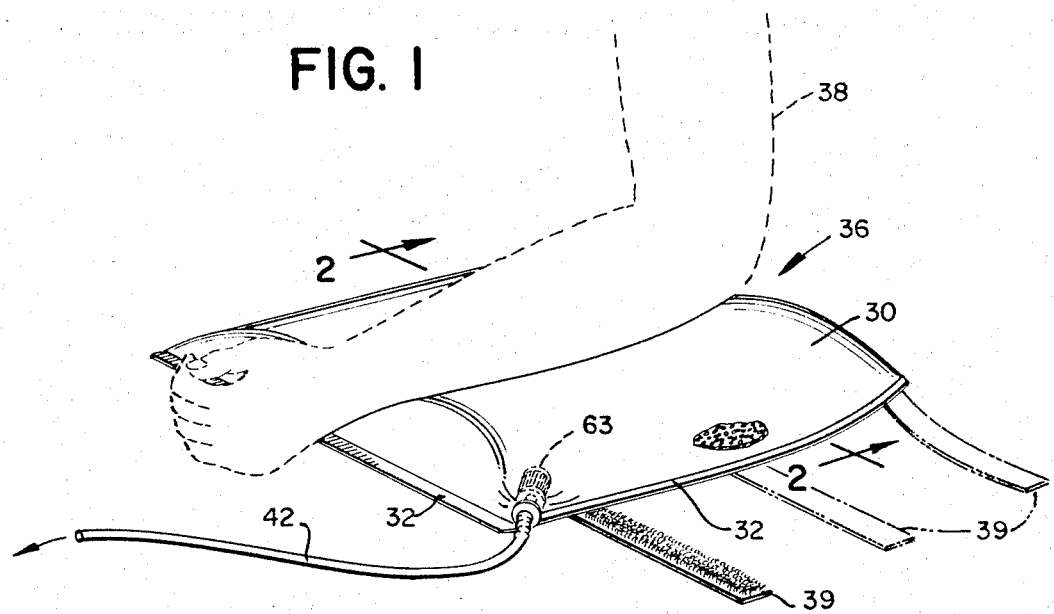
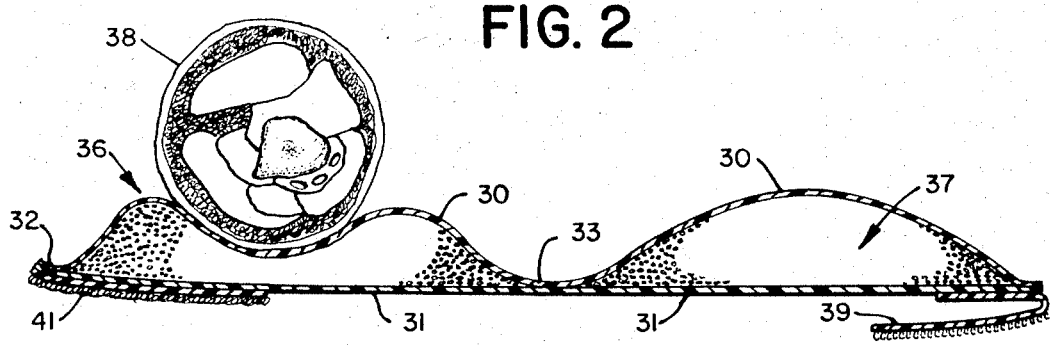
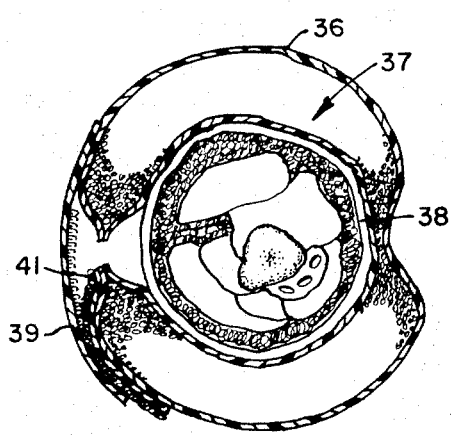
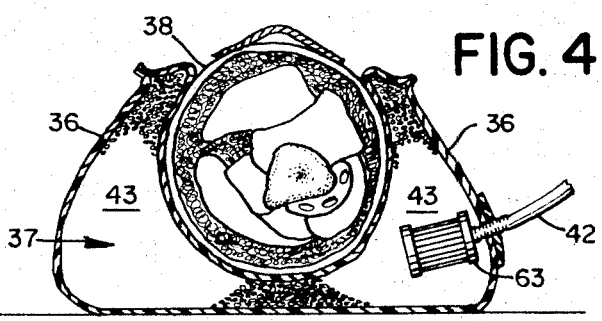

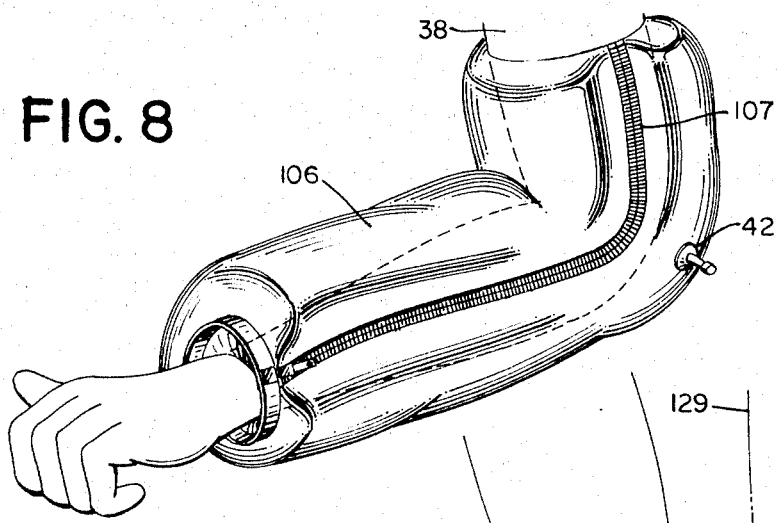
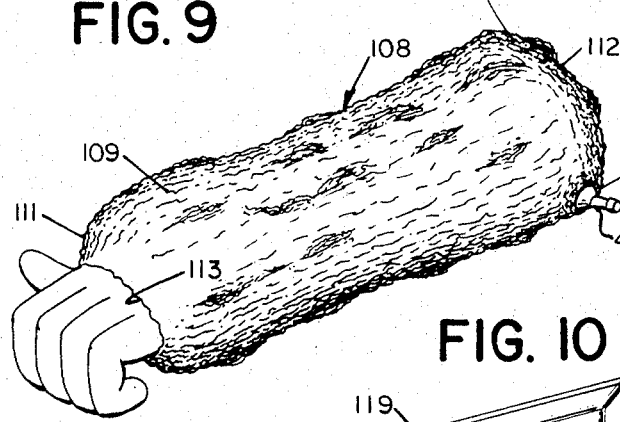
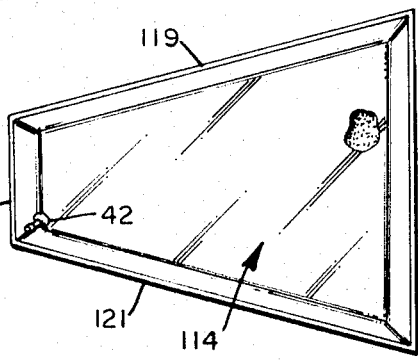
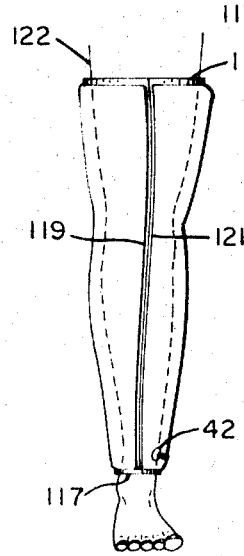
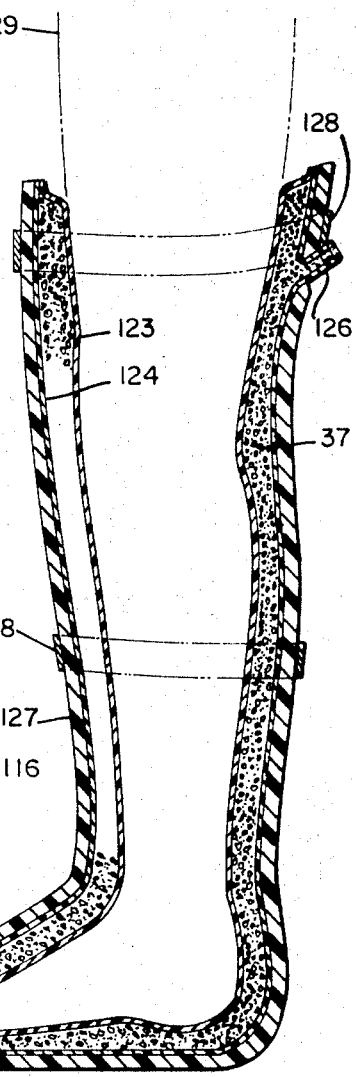

PATENTED JUL 17 1973 3,745,998

VACUUM FORMED SUPPORT STRUCTURES AND IMMOBILIZER DEVICES

RELATED INVENTION

This application is a continuation-in-part of my application Ser. No. 817,486 filed Apr. 18, 1969 now abandoned.

This invention relates to immobilizing devices for use in radiation therapy, radiology, and other medical and surgical treatment, and also to immobilizers designed to minimize injury or trauma by reducing the freedom of movement of an immobilized patient during emergency transport, surgery and recuperation.

BACKGROUND OF THE INVENTION

For many years, orthopedic casts have been made of extremely heavy, bulky, awkward materials such as wrapping of gauze bandage soaked in plaster of paris to form the familiar "plaster cast". Lighter weight structures formed of aluminum and plastic materials have been proposed from time to time, and metal cervical collars employed in the treatment of neck and head injuries have come into wide use. Because of the varieties of shapes and proportions of the human body and its limbs requiring immobilization, preformed casts and immobilizers have generally been unsatisfactory except for small, relatively uniform portions of the body such as the neck.

Conventional plaster casts are time consuming and awkward to fabricate, and they are extremely heavy and burdensome to the user. Having once been formed, they are generally not removed until the conclusion of the period of treatment, e.g., when the knitting together of broken bones has been completed. These enclosures are objectionable from many standpoints including cleanliness and ventilation of the enclosed tissue.

An additional need has existed for many years in transporting emergency accident victims to places of treatment. Immobilization of the victim is often essential to avoid further injury and minimize the effects of accidental injuries already inflicted. Unless the victim can be immobilized and transported in an immobilized condition, further injury, suffering or death is often unavoidable.

Immobilizers and support structures are highly useful in many other situations, particularly in the field of medicine and therapeutic treatment of human patients, if they are light in weight and are capable of quick and convenient conversion from a collapsed mode to a rigidified mode. These uses for alternately collapsible and rigidifiable lightweight support structures include the treatment of pulmonary disease utilizing respiration support vests incorporating internal expansible bladders; emergency cardiology vests or chest belts for closed chest resuscitation incorporating sternum displacement bladders; arm or leg immobilizers for intravenous therapy; radiologic immobilizers for positioning the body during various radiologic precedures; surgical immobilizers; geriatric immobilizers for elderly patients; head immobilizers for use during dental surgery; and combined cast-slings for supporting a fractured limb in an immobilized and relatively comfortable position. There are many other fields in which alternately collapsible and truly rigidifiable support structures prove extremely useful, although such structures have never been available in practical form. Such fields include those of veterinary medicine, toys, games, sports and entertainment. These rigidifiable support devices are also useful as custom-shaped and easily-remolded seat and back cushions for vehicles such as trucks, trains, aircraft and spacecraft, where operators and passengers are required to sit for long periods of time.

Heavy, bulky, flexible immobilizers rigidified by vacuum evacuation to compress contained plastic granules have been proposed in various forms and have come into limited use as radiology immobilizers for X-ray treatment and examination. Dickinson Pat. No. 3,212,497, issued Oct. 19, 1965, discloses one form of such a moldable temporary splint, requiring two superimposed enclosures surrounding a body of plastic particles, an outer air-imperivous bag surrounding an inner woven bag through which air can be withdrawn while solid plastic particles are retained therein. Dickinson apparently believed that this "lining" of woven material was essential to the performance of such immobilizer devices, and he failed to recognize the usefulness of compressible foam plastic particles. Heavy duty rubber bags filled with plastic granules molded by a vacuum produced by a motor driven vacuum pump have been offered for sale by the Picker X-Ray Corporation of White Plains, N.Y. The solid, heavy plastic granules employed in these conventional prior art devices and the thick, sturdy, flexible sealed enclosures required to contain them resulted in bulky and extremely heavy, uncomfortable immobilizer devices unsuitable for many applications.

German Auslegeschrift No. 1,215,859, published May 5, 1966, and its counterpart British Pat. No. 926,722 published May 22, 1963 disclose another proposal for rigidifiable immobilizers incorporating expanded polystyrene particles or beads enclosed in a flexible polyvinyl chloride film envelope, but this proposal discloses no provision for securing the granular filler material within the envelope against escape through an evacuation conduit.

SUMMARY OF THE INVENTION

It has now been discovered that highly effective and reliable immobilizer devices may be fabricated employing envelopes of resilient, stretchable, thin polymer film with elastic restoring properties, enclosing expanded polymer beads of selected low density. Various forms of these expanded foam particles are shown in FIGS. 19-20. Foamed particles of this unique construction cooperate with each other to provide far more effective immobilization action than solid granules of plastic or other materials because of their compressibility and surface deformation under atmospheric compressive loads in the evacuated and rigidified condition. Point contact between adjacent foam particles occurring under normal collapsed pressures, with atmospheric pressure being present both inside and outside the immobilizer enclosure, facilitates the rolling contact and easy manipulation of the immobilizer structures, as all of the particles roll and flow over each other in an easy manipulated formation. Accordingly, these foamed "micro-balloon" polymer particles are unusually well adapted to facilitate manipulation and forming of the collapsed support device fully around any member, portion or extremity of the patient's body with minimum resistance to movement and shaping of the support device.

At the same time, these micro-balloon particles are also adapted to stabilize and rigidify the support structure in its evacuated support mode because of their compressibility and their enlarged mutual contact areas. The extremely light weight of these expanded foam polymer micro-balloon particles provides additional advantages in lifting, transport and placement of the support devices in their collapsed mode, while providing extremely lightweight support devices useful as rigidified casts carried by the wearer.

The stretchable, elastic polymer film envelope is interfittingly deformed embracing the outermost filler particles by atmospheric pressure, and the elasticity of the pebbly-deformed film increases the particle-embracing tensile stress in the envelope, further compacting the rigidified immobilizer device and enhancing the stabilized interengagements of the rigidified body of compressible filler particles.

Accordingly, a principal object of the present invention is to provide lightweight, easily portable support structures having a collapsed mode in which they are readily formed and shaped to conform to the exterior surface of the object to be supported, and an alternative rigidified mode in which they provide sturdy, rigid, unyielding support.

A further object of the invention is to provide such support devices incorporating associated retaining means facilitating their application and removal.

A further object of the invention is to provide such support devices with a lightweight supplementary reinforcing structure incorporated therein.

Another object of the invention is to provide such support devices incorporating an elastic, stretchable envelope enclosing lightweight polymer particles, with evacuation tubing connected to the support devices by foraminous distributor units, in a manner permitting evacuated gas to be withdrawn through the distributor units and the evacuation tubing while retaining the lightweight polymer particles inside the elastic envelope.

A further object of the invention is to provide support devices incorporating such an elastic envelope formed of thin resilient film having substantial "elastic memory" properties, of sufficient thinness to assume a pebbly, "corrugated" or "shrunken" condition closely embracing the particles of filler materials in the evacuated rigidified mode of the device and thereby enhancing its immobilizing efficacy, while also quickly returning to its original flat unstretched sheet condition, to substantially its original dimensions, upon removal of a pressure differential from the enclosing envelope.

Other and more specific objects will be apparent from the features, elements, combinations and operating procedures disclosed in the following detailed description and shown in the drawings.

THE DRAWINGS

FIG. 1 is a perspective view of an immobilizer device of the present invention shown in its collapsed mode ready for application to a patient's forearm;

FIG. 2 is a sectional elevation view of the immobilizer of FIG. 1 shown in its collapsed mode with the patient's forearm being shown positioned on a portion of the collapsed immobilizer;

FIG. 3 is a corresponding cross sectional elevation view showing the same immobilizer applied to the patient's forearm, secured in its applied condition and rigidified in its support mode;

FIG. 4 is a corresponding cross sectional elevation view showing a slightly modified immobilizer of the type illustrated in FIG. 1, shaped and formed to conform to the external peripheral surface of the patient's forearm and leaving a portion of the forearm exposed for purposes of intravenous injections, feeding or similar treatment;

FIG. 8 is a perspective view of a lightweight portable forearm cast support device of the present invention, shown in its collapsed mode;

FIG. 9 is a similar perspective view of a modified lightweight portable forearm cast of the present invention, shown in its rigidified mode;

FIG. 10 is a top plan view of a lightweight portable leg cast support device of the present invention, shown removed from the patient and unrolled in flat condition;

FIG. 11 is a top plan view of the leg cast support device of FIG. 10, shown enclosing the leg of a patient;

FIG. 12 is a side cross-sectional elevation view of a modified leg and foot support device of the present invention, formed in the shape of a boot;

OPERATION OF THE INVENTION

The immobilizer devices of the present invention are characterized by a collapsible and rigidifiable flexible envelope incorporating one or more cavities, preferably connected together by internal passages, and containing a large number of small, extremely lightweight granules or particles preferably formed of foamed polymer material, which may be micro-balloon configurations comprising a foamed polymer shell surrounding an enlarged central cavity or bubble.

Figure 19:
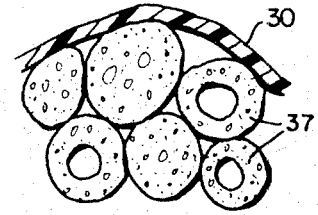
FIG. 19 is a greatly enlarged fragmentary cross sectional elevation view showing the foamed polymer micro-balloon granules inside the immobilizers of this invention in the collapsed mode.
Figure 20:
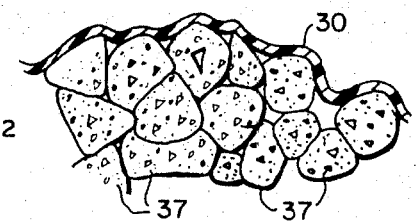
FIG. 20 is a corresponding greatly enlarged fragmentary cross-sectional elevation view showing these micro-balloon granules in their rigified, evacuated support mode.

As illustrated in the greatly enlarged fragmentary cross section views of FIGS. 19 and 20, foamed polymer particles of this kind are drastically deformable and compressible. They normally lie loosely in an unstressed condition to provide generally spherical globules or granules which roll easily upon each other to produce ready manipulation and shaping of the flexible envelope enclosures of these immobilizers, for maximum conformance with the surface of the object to be supported, such as the patient's arm; when the envelopes are evacuated, however, atmospheric pressure compresses the flexible outer envelope and applies substantial deformation pressure to the entire mass of compressible foamed plastic granules, squashing and deforming them to form the compacted mass shown schematically in FIG. 20. In this rigidified mode, contact points where the surfaces of adjacent granules touch are drastically enlarged to provide very substantial flattened contact areas between adjoining granules in a tightly compacted mass, significantly inhibiting rolling movement of each granule. Similar deformation of the granules 37 occurs to a slightly lesser extent if they are formed of substantially uniform cellular foam, without a central cavity; both forms of these particles 37 are notably compressible or deformable.

Accordingly these foam polymer particles possess the important advantage of extremely light weight, while achieving unusually effective alternative collapsing and rigidifying action, converting the immobilizer devices of this invention between their collapsed mode and support mode instantly with the application of partial vacuum to the interior of the enclosing envelopes or with the alternative admission of atmospheric pressure thereto.

LIMB IMMOBILIZERS

Figure 5:
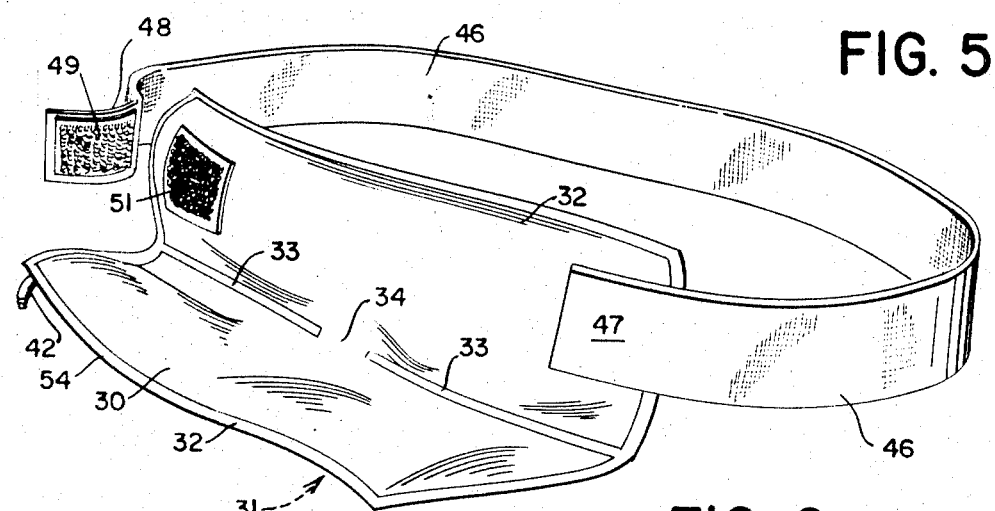
FIG. 5 is a perspective view of a modified embodiment of the immobilizer showing different securing means incorporated therein.

The perspective views of FIG. 1 and FIG. 5 both show typical flexible envelopes preferably formed of flexible plastic sheets of material cut into correspondingly shaped sheets and sealed together around their mating peripheries to form a closed, pressure-tight envelope. In FIGS. 1-7 an upper sheet 30 and a lower sheet 31 preferably formed in substantially coinciding rectangular configurations are joined together by such means as heat sealing to form a peripheral seam 32 extending around all parts of their peripheries. Central partition seams 33 are shown in FIGS. 2 and 5, extending from peripheral seam 32 into the central region of the sheets 30 and 31 and subdividing the cavity enclosed between the sheets 30 and 31 into separate regions preferably joined by an access passagway 34, inhibiting the passage of granules therethrough but admitting atmospheric pressure to and permitting evacuation of gas quickly and conveniently from all portions of the closed envelope 36 formed in the foregoing manner.

As shown in the cross sectional elevation views of FIGS. 2, 3, 4, 19 and 20, the interior of envelope 36 is partially filled loosely in the collapsed mode with a very large number of small extremely lightweight granules preferably formed of foamed polymer material as described above. These particles 37 are freely and loosely packed in the envelope 36 in its collapsed mode illustrated schematically in FIG. 2 and shown greatly enlarged in FIG. 19, permitting free rolling contact between the particles 37 and easy manipulation of the overall immobilizer envelope 36 to conform to the patient's arm 38. Manipulation is normally required to mold the collapsed device because particle migration is inhibited by static charges accumulating on the polyurethane envelope 30, attracting the styrofoam filler particles 37. Retarded migration of filler particles is desired to maintain uniform cushion thickness during molding of the device.

If desired, an access passage 34 may span each end of the internal cavity, air-mattress fashion, or partition seams 33 may extend alternately from opposite ends to form a "maze" cavity, further retarding migration of filler particles during manipulation of the device in its collapsed mode.

In utilizing the immobilizers of this invention, envelope 36 is loosely and comfortably positioned beneath the patient's body as illustrated in FIG. 2, with the patient's limb or body portion to be immobilized being positioned near one edge or one side of the immobilizer envelope 36. The remaining portion of the envelope 36 is then wrapped firmly about the patient's arm 38 as shown in FIG. 3 and secured in this retained position by such means as "Velcro" hook fabric straps 39 secured to the lower sheet 31 and extending out beyond its periphery to protrude from one side edge of the envelope 36, as shown in FIGS. 1 and 2, cooperating with Velcro fabric patches 41 secured to the outside of the lower sheet 31 along the opposite edge of the envelope 36 for mating engagement by the Velcro straps 39 in the manner illustrated in FIG. 3. Velcro is the registered trademark of Smalley & Bates, Inc., identifying its disengageable securing material comprising open loop pile fabric cooperating with tiny protruding plastic hooks deformable for engagement with the loop pile and individually deformable for peeling disengagement therefrom. After being securely wrapped and retained around the patient's arm 38 as shown in FIG. 3, the envelope 36 is evacuated by connecting a source of negative pressure to an evacuation tubing 42 opening a source of negative pressure to an evacuation tubing 42 opening through a distributor unit of the kind illustrated in FIGS. 14-18 to permit the air or gas inside envelope 36 to be withdrawn via tubing 42 without dislodging or removing any of the particles 37 therethrough.

FIG. 4 shows an alternative configuration of the immobilizer envelope 36 in its rigidified support mode, in which Velcro retaining means 39 and 41 are not employed. In this configuration, the immobilizer envelope 36 in its collapsed mode is "banked" or mounted up around each side of the patient's arm 38 or other extremity being immobilized, and the envelope 36 is then evacuated to rigidify it in this molded condition, with securing ridges 43 flanking the patient's body or arm 38 to hold it naturally and comfortably in a relaxed position secured against rolling movement or displacement. In this configuration of FIG. 4, a substantial sector of the periphery of the patient's arm 38 is exposed for the application of an intravenous feeding tube 44, for connection with kidney dialysis or other blood bypass machines or for any extended treatment required.

LIGHTWEIGHT SLING-CAST

Figure 6:
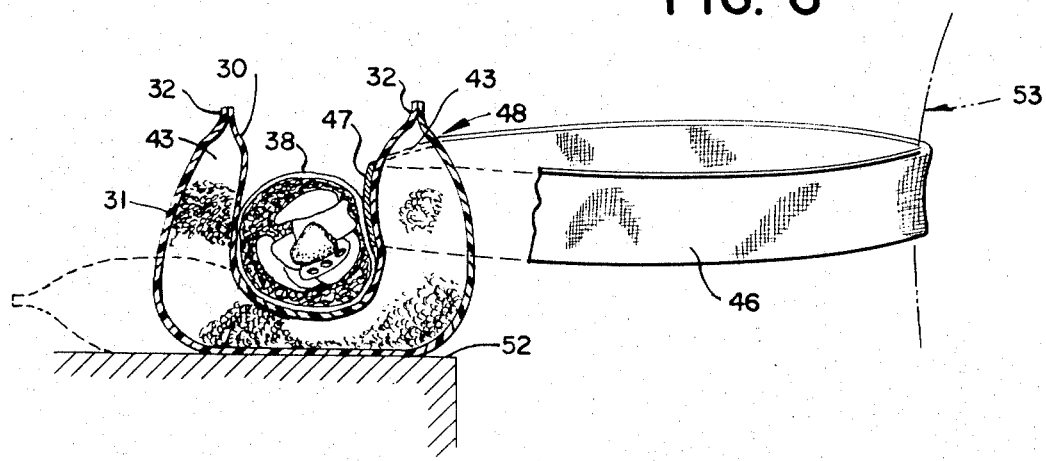
FIG. 6 is a cross sectional elevation view showing the immobilizer of FIG. 5 in the course of application to form a combined sling and rigidified, temporary cast for a patient's forearm, easily secured to the patient's body as shown in the perspective view of FIG. 7.
Figure 7:
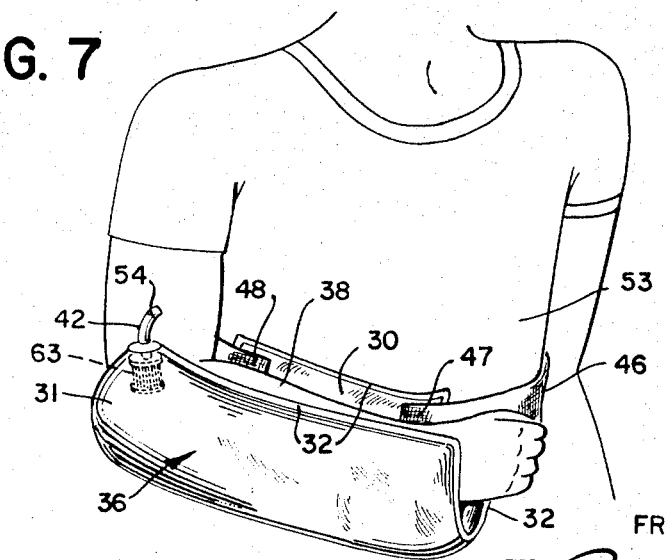

FIGS. 5, 6 and 7 show a modified embodiment of the envelope 36 incorporating a waist strap 36 formed as an elongated band of webbing having one end 47 secured by cement or the like to upper sheet 30 near one corner thereof and having an opposite free end 48 provided with quick convenient securing means such as Velcro hook fabric 49 positioned for engagement with a patch of Velcro loop fabric 51 mounted facing outward at a corner portion of upper sheet 30 longitudinally opposite the secured end 47 of the restraining strap 46.

The envelope 36 may be laid out in the dash line position illustrated in FIG. 6 with the major part of its area lying on a table or other support surface 52. The waist strap 46 may be drawn around the waist 53 of the wearer, with the free end 48 being carried around and behind the wearer's waist to permit engagement of Velcro patches 49 and 51, securing this free end 48 to envelope 36 while waist strap 46 is firmly and snugly positioned around the wearer's waist. The wearer's forearm 38 may then be placed comfortably on envelope 36, a portion of which is mounded up against the adjacent side of the wearer's waist and secured there by waist strap 46. The opposite exposed edge of envelope 36 may be correspondingly mounded upward to form with the waist strap edge of envelope 36 a pair of ridges 43 similar to ridges 43 shown in FIG. 4, firmly and snugly enclosing the wearer's forearm 36 therebetween. A detachable vacuum coupling 54 forming a termination of a short evacuation tubing 42 is then connected to a course of vacuum, and the envelope 36 is quickly evacuated to rigidify it in the desired supporting position illustrated in solid lines in FIGS. 6 and 7. The vacuum coupling 54 may then be closed off and sealed to maintain the immobilizer envelope 36 in its firm, rigidified support condition forming a cast for the wearer's forearm 38 weighing no more than a pound or two, comfortably supported by a wide, snug waist strap 46 with no burdensome load upon the wearer's shoulders as with conventional heavy plaster casts and fabric bandana slings.

The combined sling-cast devices shown in these FIGS. 5-7 possess numerous advantages over conventional casts and slings. In addition to extremely light weight and the elimination of loading and abrasion of patient's shoulder, they are conveniently applied in a brief period with no nned for wrappings and plaster of paris. The immobilizer device 36 of FIG. 7 may be easily and conveniently collapsed by the patient whenever he desires for easy treatment or cleaning of the supported forearm 38, and this envelope 36 may again be quickly and easily rigidified to place it in its support mode utilizing hand operated suction pumps, electrically powered blower-aspirators, or portable vacuum sources such as the Miller-Stephenson Chemical Company "Porta-Vac" aerosol jet pump aspirator device which is well adapted to provide the source of vacuum employed with the immobilizers of this invention for use in the field or in emergency conditions when conventional vacuum pumps are not available. Even mouth suction may be used if no other vacuum source is available.

SLEEVE-SHAPED LIMB SUPPORT DEVICES

FIGS. 8-12 illustrate various forms of sleeve-shaped support devices fo enclosing patients'arms or legs in rigidifiable and collapsible castlike sheaths, which can be easily removed for washing and ventilating the affected limb and conveniently reinstalled and rigidified without requiring movement of the limb.

The sleeve-shaped cast support device 106 shown in FIG. 8 is preferably rectangular in shape, with its opposite long edges being provided with a metal or plastic slide fastener 107 or comparable securing means removably joining these juxtaposed edges, to position the device 106 in a generally cylindrical, sleeve-like configuration. The device 106 is preferably 18 inches to 24 inches in length, adapting it to extend from the wrist along the forearm of a patient past his elbow to encircle a portion of his upper arm, thereby providing immobilization for wrist, elbow and forearm fractures.

In use, the device 106 is placed in position with its long edges juxtaposed and joined by the slide fastener 107. After being loosely arranged around the arm 38 of the wearer, the device 106 is immobilized by withdrawing air from its interior through the evacuation conduit 42, and thus converting the device from its collapsed mode to its evacuated, rigidified mode, immobilizing the patient's arm 38. Unlike a conventional plaster cast, the sleeve-shaped cast device 106 of FIG. 8 can be quickly and conveniently reinflated, causing it to collapse, whereupon the zipper 107 may be unzipped and the entire device instantly removed from the patient's arm for ventilation, cleansing, examination or treatment. Thereafter, the same device 106 may be quickly reinstalled on the arm 38, or cleaned and reused for another patient if desired.

The similar and shorter sleeve device of FIG. 9 is formed as a sleeve-shaped envelope 108 having an outer cylindrical wall 109 joined at both its ends 111 and 112 to a cylindrical interior wall 113, which is juxtaposed to the patient's forearm, for example, as indicated in FIG. 9. The sleeve device 108 is easily mounted on the patient's forearm 38 when the device 108 is in its collapsed condition, merely being drawn telescopingly over the patient's hand and wrist up to his elbow if desired, as shown in FIG. 9. The device 108 is then evacuated through the evacuation conduit 42, causing the device to assume its rigidified mode within a few seconds after its installation.

The leg immobilizer illustrated in FIGS. 10 and 11 is generally similar to the forearm immobilizer 106 shown in FIG. 8, but the leg immobilizer 114 is preferably trapezoidal in shape to accomodate the large circumference of the patient's thigh and the much smaller circumference of the patient's ankle. Thus the corners of the leg immobilizer 114 terminating its wide upper end 116 are connected to the corners of its narrow and lower end 117 by generally straight converging side edges 119 and 121, which may be provided with securing means such as the slide fastener 107 shown in FIG. 8, if desired, or with such associated retaining means as a plurality of the Velcro straps 39–41 shown in FIGS. 1, 2 and 3. The evacuation conduit 42 may be installed near one of the corners at the lower end 117 of the device, as shown in FIGS. 10 and 11.

It will be understood that the leg immobilizer 114 is formed of two substantially similar trapezoidal sheets of thin film material sealed together around their edges to form an enclosure similar to the envelope 30 shown in FIGS. 1–7, partially and loosely filled with expanded polymer beads 37.

When the leg immobilizer 114 is placed under a patient's leg and its two converging edges 119 and 121 are raised to enclose the patient's leg 122, the edges 119 and 121 may be juxtaposed, as shown in FIG. 11, and any suitable joining means such as the slide fastener 107 may be employed to secure these edges in their juxtaposed relationship, forming the leg immobilizer envelope 114 into a conically tapered sleeve loosely encasing the patient's leg from the ankle to the thigh, as illustrated in FIG. 11. When the leg immobilizer envelope 114 is then evacuated through the evacuation conduit 42, atmospheric pressure forces the envelope into close juxtaposition with the expanded polymer particles enclosed therein, firmly rigidifying the immobilizer 114 to maintain the patient's leg 122 in the desired position.

The boot-shaped immobilizer 122 shown in FIG. 12 provides sturdy support for a patient's leg, because it comprises a rigidifiable envelope formed of an inner wall 123, edge-sealed to an outer wall 124 of thin flexible film or sheet material, enclosing between themselves a substantial volume of space surrounding the patient's upper leg and lower leg, his knee, his ankle and his foot, as illustrated in FIG. 12. The space between the walls 123 and 124 is partially and loosely filled with lightweight expanded polymer foam particles 37, and additional particles may be added or removed through a portal 126, which also serves as an evacuation conduit if desired. The outer wall 124 of the evacuable envelope is bonded to a supporting layer formed in the shape of an outer boot 127, which may be composed of a thick sheet of flexible rubber, vinyl or other polymer material, if desired incorporating reinforcing straps 128 at two or more levels above the patient's ankle as shown in FIG. 12. In use, the hollow interior sleeve-like cavity of the device between walls 123 and 124 is collapsed so that the particles therein are loosely arrayed, and offer no resistance to the insertion of the patient's foot and leg 129 within the device to the position shown in FIG. 12. Additional particles of filler material may be added through the portal 126 if desired, and the encircling straps 128 may be adjusted to provide the desired reinforcement. The device is then evacuated by drawing air from the interior cavity of the device through the portal 126, through a distributor unit of the kind shown in FIGS. 14–20 and 23 to retain the particles of filler material within the cavity. The resulting pressure differential allows atmospheric pressure to urge the walls 123 and 124 together, securely clamping the filler particles therebetween in a rigid, immobilizing position, anchoring the wearer's leg 129 in position therein and inhibiting articulating movement of the wearer's knee, ankle and foot to a substantial degree.

CERVICAL COLLARS

Figure 13:
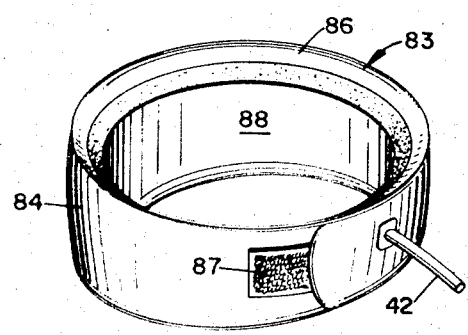
FIG. 13 is a perspective view of a cervical collar adjustable to fit the patient's neck and solidifiable to provide firm solid support combined with extremely light weight.

A cervical collar immobilizer 83 incorporating the devices of the present invention is illustrated in FIG. 13, where the collar 83 is shown to comprise an outer flexible sheet of lightweight material such as polymer sheet 84 and a similar inner flexible sheet 86 sealed together along their peripheral edges to form a neck band enclosing lightweight foam polymer particles or microballoon granules 37 as shown in FIG. 19 and having an evacuation tubing 42 connected to its interior through a suitable distributor unit, such as the distributor units 63, 92, 93 or 100, illustrated in FIGS. 9 and 14–18. The free end of outer sheet 84 is provided with a Velcro loop patch 87 aligned for juxtaposition with an engaging Velcro hook patch formed on the free end of the inner sheet 86, which is overlapped and engaged therewith to form the enclosed cervical collar configuration illustrated in FIG. 13. For comfortable contact with the wearer's neck, collar 83 is preferably lined with an annular ring of soft depressible foam material 88, which is cemented inside the inner sheet 86 forming the interior portion of the cervical collar envelope 83. After being wrapped and secured with the Velcro attachment 87 and its mating Velcro loop patch in a firm, tight, comfortable fit around the wearer's neck, the collar 83 is rigidified by drawing a vacuum through evacuation tubing 42, which is then clamped or sealed to maintain the collar in its rigidified immobilizing condition for the length of time required, and easily collapsed and reset whenever desired.

SUPPORTED MATS AND PADS

Figure 21:
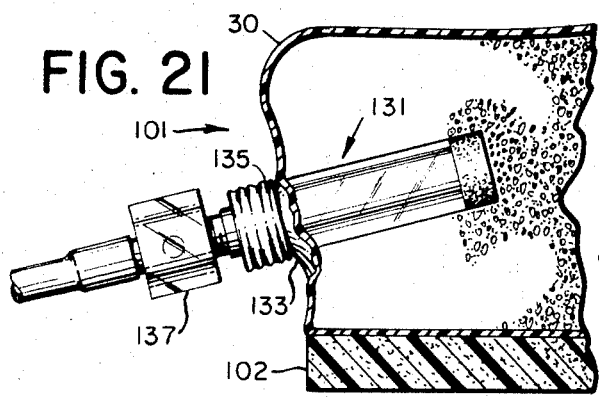
FIG. 21 is a fragmentary cross-sectional side elevation view of a cushion shaped support device of the present invention incorporating an underlying flexible support panel, and showing a foraminous distributor unit mounted at one side thereof.
Figure 22:
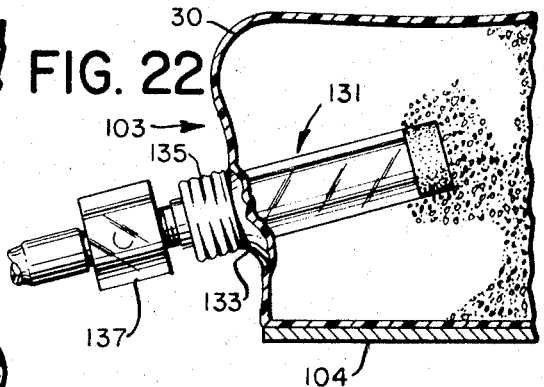
FIG. 22 is a similar fragmentary cross-sectional side elevation view of a modified cushion shaped device of the present invention incorporating an underlying, substantially rigid support panel.

Shown in FIGS. 21 and 22 are immobilizer envelopes of the present invention incorporating underlying support layers of additional material laminated thereto. Immobilizer envelope 101 is provided with an underlying support panel of lightweight expanded foam material 102, shown as polymer foam material in FIG. 21. Panel 102 may have the degree of supporting rigidity or cushioning flexibility desired for its intended purpose, and a thick panel 102 of soft resilient plastic foam adapts immobilizer 103 for use as a soft, comfortable mat or mattress. Alternatively, immobilizer 103 is provided with a thin, stiff underlying support panel 104 of aluminum or the like, adapting the device for use as an immobilizer-transport platform for a patient or other relatively heavy objects.

Either of these immobilizers 101 or 103 may be incorporated in the cushioning structures of the seats and backs of vehicle seats, and may be molded, rigidified, collapsed, or reset at will by their individual users, for comfortable repositioning and firm support of passengers and vehicle operators.

BODY SUPPORT DEVICES

Figure 24:
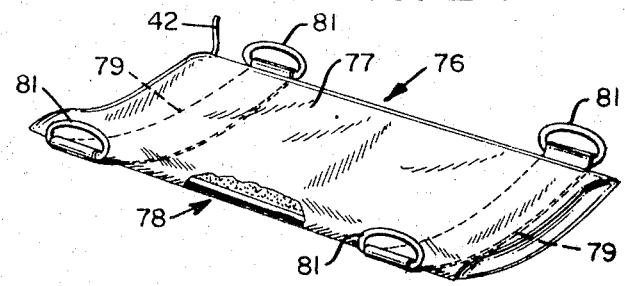
FIG. 24 is a perspective view of a collapsible and rigidifible stretcher for extremely lightweight, firm, unyielding support of a patient requiring emergency transportation.
Figure 25:
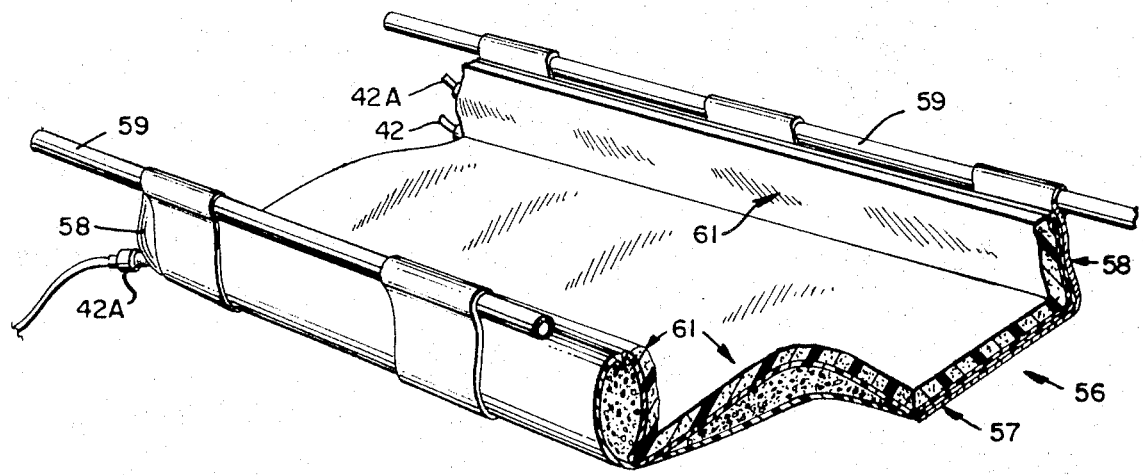
FIG. 25 is an enlarged perspective view of a modified collapsible and rigidifible strecther having a generally U-shaped cross-section, shown partially cut away to reveal the structural details thereof.

Rigidifiable immobilizers designed to support the entire weight and extent of the human body are illustrated in FIGS. 24 and 25 in the form of litters or stretchers suitable for use in transporting accident victims or combat casualties from the field via emergency rescue vehicles to patient care installations. Combat and accident casualties generally require immobilization to avoid worsening of their injuries during transport, and the immobilizer device of FIG. 24 is uniquely adapted to support the entire human body in an immobilized condition. It comprises a stretcher-shaped rectangular unit formed of an upper sheet 77 and a lower sheet 78 sealed together around their peripheral edges to form an envelope 76, which is filled with extremely lightweight granules preferably formed of foamed polymer particles or micro-balloons 37 like those characterizing the other embodiments of the invention shown in the preceding figures. Reinforcing straps 79 preferably extend from side to side, across the exposed outwardly facing under surface of lower sheet 38, terminating in carrying handles 81 at each side of the envelope 76. Lightweight tubular aluminum reinforcing bars 82 preferably extend along the parallel sides of the rectangular stretcher envelope 76 to maintain it in a substantially flat condition.

When the envelope 76 is in its collapsed condition, the patient is gently placed upon upper sheet 77 and the weight and shape of his body produce natural depressions in the loosely packed granular particles 37 within the envelope 76. The envelope is formed about the patient and then rigidified by exposing its interior to a partial vacuum through the evacuation tubing 42, which is then clamped or sealed to retain the vacuum and maintain the stretcher envelope 76 in its rigidified mode for the period of time required to transport the patient.

The compact, portable, lightweight device shown in FIG. 24 is well adapted for emergency handling of victims of skiing injuries, since it can be strapped to the back of a ski patrol member who thus avoids the burden of conventional metal or other heavy "snow wing" type litter devices, and consequently can reach the injured victim by the fastest lift means available. The patrol member can then place the injured skier in the collapsed immobilizer device, mold and rigidify it quickly and conveniently at the site, and then use it as a sled to transport the victim down the slope, on skis if desired to minimize abrasion damage to the underside of envelope 76.

A modified stretcher immobilizer 56 having a U-shaped cross-section is shown in FIG. 25, where the collapsible and rigidifiable envelope enclosing the filler particles incorporates a bottom portion 57 and upstanding sidewall portions 58 surmounted by lightweight carriers 59 of tubular aluminum, extruded plastic or the like. For transporting burn victims, a foam liner 61 of flexible polyurethane foam having a slick, non-adherent surface is mounted on the inner surfaces of portions 57 and 58 of the envelope, facing the patient, to minimize injuries to exposed burned areas of the patients' skin. The "Roehampton Burns and Trauma Dressing" made by Price Brothers & Co., Ltd. of Great Britain and marketed in the United States by Roehampton Medical Supply Co. Ltd., of Rochester, N.Y., serves well as liner 61. Sidewall portions 58 of immobilizer 56 aid in securing the patient against lateral movement during transport, and may be independently evacuated by supplementary evacuation conduits 42A if desired, for additional immobilizing support of the patient.

The immobilizer devices of this invention are highly useful in rehabilitation centers where paraplegic patients need continuous support, and frequent movement and changes of position. Many hospitals possess only one or two expensive Stryker frames with which to perform this overwhelming task. With the economical, readily available and easily used immobilizers of the present invention, whole groups of patients can be immobilized in different positions at specific times, and given full benefit of frequent changes of position by only a single professional attendant.

Similar body support immobilizers for supporting, enclosing and immobilizing the human body or major portions thereof are useful in many patient care situations. For example, geriatric nursing homes accomodate many elderly patients who must be maintained immobilized in chairs or beds. For this purpose, immobilizers are required which can be easily and conveniently shaped to conform to the patient's body and which can be rigidified and collapsed at will. The immobilizers of the present invention are uniquely adapted to provide support and instantly available immobilization, and they may be collapsed and removed immediately whenever desired to avoid bed sores, cramps or patient fatigue and to optimize patient care in all respects. Ambulatory geriatric patients often require immobilizers operative in a sitting position, and upholstered chairs incorporating the immobilizer units of the present invention are useful in securing these elderly patients against fainting or inadvertent movements which might endanger their health and safety. These geriatric immobilizers utilize collapsible and rigidifiable envelopes incorporated in chair upholstery which are otherwise generally similar to the envelopes 36 and 76 shown in FIGS. 1–4, 21, 22 and 24. Preferably they incorporate the same lightweight foam particles or micro-balloon granules 37 illustrated in FIG. 19 rigidified by the withdrawal of a portion of the gas within the envelope to permit atmospheric pressure to compress, deform and lock the particles into the stablizied, rigidified condition illustrated schematically in FIG. 20.

DISTRIBUTOR UNITS

A series of distributor units of different forms and shapes are illustrated in FIGS. 14–18 and 23. These include a cylindrical distributor unit similar to an automotive gasoline filter shown in FIGS. 14 and 15, a foraminous ceramic disk shaped distributor unit shown in FIG. 16, a flat distributor 100 of porous sheet material, such as porous filter paper, illustrated in FIGS. 17 and 18, and a plastic distributor assembly 131 incorporating a porous filter plug of rigid open cell polyurethane foam.

Each of these distributor units is preferably secured inside the entrance portal end of the evacuation tubing 42, at the point where it enters the immobilizer envelope 36. A suitable adapter conduit 89 may have a series of step-tapered wedging ring portions 91 to hold it securely in operative position within the entrance portal end of the evacuation tubing 42, as shown in FIG. 14, or the swaged cap fitting 137 of FIG. 23 may be used.

Figure 14:
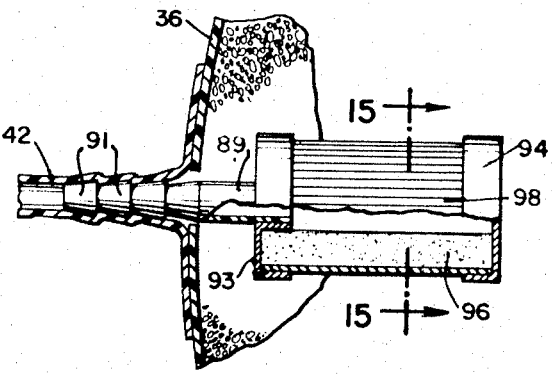
FIG. 14 is a fragmentary sectional plan view, greatly enlarged, showing an evacuation tube terminating in a distributor unit inside a flexible envelope enclosing the polymer particles or granules in an immobilizer device of the present invention.
Figure 15:
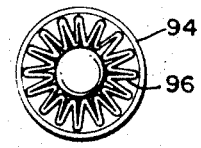
FIG. 15 is a cross sectional elevation view of the distributor device shown in FIG. 14.

In the automotive gasoline filter cylindrical distributor unit 92 shown in FIGS. 14 and 15, the cylinder ends are formed of relatively rigid metal caps with inturned facing rims: a centrally apertured entrance cap 93 securely mounted on the open end of the adapter conduit 89 as illustrated in FIG. 14, and a facing, opposed, unapertured cap 94, both preferably formed of sheet metal. The generally cylindrical side walls of the distributor unit 92 are formed of an accordion-folded filter paper sheet 96 deriving considerable strength from its corrugated, accordion-folded configuration, and having its ends firmly "potted" or "cemented" in epoxy resin within the inturned rims of the disk shaped end caps 93 and 94. These end caps form with the accordion folded porous cylindrical wall an enclosed cylindrical distributor unit surrounding a central plenum chamber 98, serving to draw the air from the envelope 36 through the porous filter wall 96 and the adapter conduit 89 out the evacuation tubing 42 while retaining the granules 37 and preventing them from entering the evacuation tubing 42. A similar distributor function is served by the foraminous ceramic disk shaped distributor unit 97 of FIG. 16, having a hollow central cavity 98 formed therein shown in dash lines communicating with the adapter conduit 89, which is inserted in the entrance portal end of the evacuation tubing 42 as shown in FIG. 14. The body of the ceramic disk shaped distributor unit 97 completely encloses the central plenum chamber 98 with walls of a foraminous or porous ceramic or foamed metal material, permitting the passage of gas while blocking the passage of the granular particles 37 filling the envelopes of the immobilizers of this invention.

Figure 16:
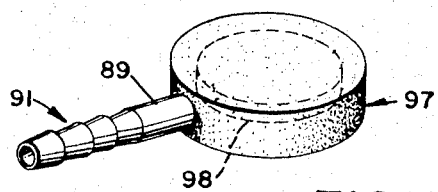
FIG. 16 is a perspective view of a foraminous distributor device of a different design.

The foraminous ceramic disk shaped distributor unit of FIG. 16 may be formed alternatively of porous or foamed metal such as aluminum or nickel for additional strength and fracture resistance, and a relatively rigid open cell plastic foam material may also be used for this purpose if desired.

Figure 17:
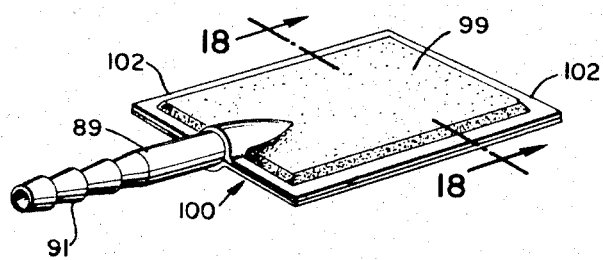
FIG. 17 is a corresponding perspective view of a distributor device of still another design.
Figure 18:
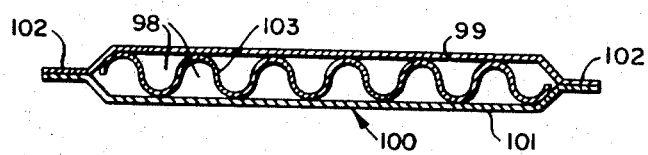
FIG. 18 is a cross sectional elevation view showing the internal construction of the distributor device of FIG. 17.

The substantially flat distributor unit 100 shown in FIGS. 17 and 18 may be formed of extremely lightweight porous filter material such as a sheet of filter paper 99 mated with a second sheet of filter paper 101, both having similar shapes, such as the rectangular configuration illustrated in FIG. 17, and having their edges firmly sealed together to form a peripheral seal 102. The first and second sheets of porous filter paper 99 and 101 are separated from each other by a baffle device sandwiched between them, such as the substantially rigid corrugated spacer 103 shown in the cross section of FIG. 18, which serves to maintain the two outer filter paper sheets 99 and 101 spaced apart to define a substantial plenum chamber 98 between them, permitting the withdrawal of air through the entire exposed surfaces of the two filter paper faces of the rectangular distributor unit 100. Withdrawn air is afforded numerous ample escape channels through the spaces 98 between the corrugations of spacer 103, whence it travels through the adapter conduit 89 and the evacuation tubing 42 in the manner illustrated in FIG. 14.

Figure 23:
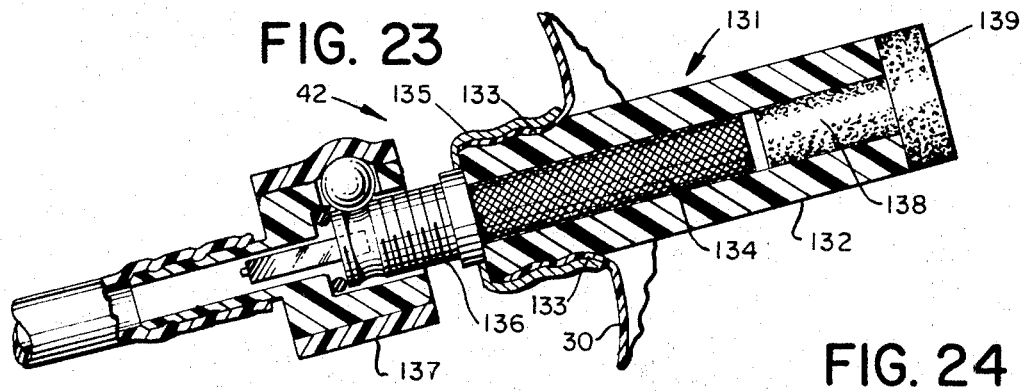
FIG. 23 is a greatly enlarged, fragmentary, cross-sectional, side elevational view of foraminous distributor unit incorporated in preferred embodiments of the present invention.

The modified distributor unit 131 of FIG. 23 has been found useful with many different configurations of immobilizers of the present invention. The distributor 131 incorporates as an adapter conduit a short length of vinyl tubing 132 positioned within an outwardly extending open-ended neck portion 133 formed in the thin film sheet material 30 of the enclosing envelope of the immobilizer device. The internal diameter of the neck portion 133 is approximately the same as the external diameter of the vinyl tubing 132, and if desired a force fit of the tubing 132 within the neck portion 133 assures a solid anchored connection of the distributor unit 131 in the envelope. Positioned within the central bore of tubing 132 is a Schroeder valve assembly having a knurled anchor portion 134 telescopingly fitted within the vinyl tubing 132, and an integral contiguous exhaust portal portion 136 extending beyond neck 133 outside the envelope, and adapted for telescoping engagement within the vacuum terminal coupling 137 of a vacuum pump conduit.

Firm anchored engagement of the valve assembly 134–136 within the vinyl tubing 132 and the neck portion 133 of the envelope 30 is assured by a swaged cap fitting 135 deformingly compressing and embedding the neck portion 133 into the vinyl tubing 132 around the knurled portion 134 of the Schroeder valve assembly.

Extending from the anchoring portion 134 of the valve assembly along the interior bore of the vinyl tubing 132 into the interior of the immobilizer envelope 30 is a foraminous porous filter plug 138 preferably protruding from the interior end of the tubing 132 in an enlarged convex distributor zone 139. The porous filter plug 138 is preferably formed of rigid open cell polyurethane foam sold under the trademark "Porex" by Porex Materials Corporation of Atlanta, Ga. In this form of the distributors incorporated in the present invention, the plenum chamber is formed within the knurled anchoring portion 134 of the Schroeder valve assembly, while the distributing function is provided by the porous or foraminous open cell foam plug member 138–139, whose exposed pores are generally smaller than the majority of the particles of expanded foam filler material to which they are exposed. Further, the convex exterior surface of the protruding distributor zone 139 assures that any of its exposed peripheral pores which might be clogged by small individual particles of filler materials will be surrounded by many open pores through which air inside the envelope 30 may be readily evacuated.

All of these distributor units shown in FIGS. 14–18 and 23 serve the purpose of eliminating the need for larger woven envelopes corresponding generally in size and shape to the external flexible envelope of the immobilizer itself, and in this manner the extra expense of woven envelopes of the kind recommended in Dickinson Pat. No. 3,212,497 and the difficulties of fabrication and alignment of these mating congruent envelopes are entirely eliminated in the novel immobilizers of the present invention.

STRETCHABLE ELASTIC ENVELOPE FILM MATERIALS

Numerous evacuated envelopes have been proposed for use as rigidified immobilizing devices, as in the German Auslegeschrift No. 1,215,869, U.S. Pat. No. 2,749,910, and Dickinson U.S. Pat. No. 3,212,497. These patents suggest the use of envelopes of flexible sheet material such as rubber or polyvinyl chloride. Such sheet materials are there described as flexible and air impervious, but these prior art patents fail to specify the thickness or desirable physical characteristics of the envelope material itself.

It has now been found that comparatively thin polyurethane film provides high abrasive resistance coupled with resistance to burning and melting and excellent non-allergenic qualities, while also providing the resilient elastic stretching and shrinking qualities normally associated with Latex rubber. Polyurethane film between 0.002 inches and 0.014 inches thick provides excellent immobilizing action. Film thicknesses between 0.004 and 0.008 inches thick are preferred, and 0.006 inch thick polyurethane film has been found to provide the most effective immobilizing action, apparently because films having this degree of thinness are unusually supple and flexible, conforming easily to the outer shape of the entire outermost layer of filler particles under the urging of atmospheric pressure.

As the envelope is evacuated and the pressure differential increases between the interior and the exterior of the envelope, atmospheric pressure applied to this thin sheet film material increasingly forces the envelope film into close interfitting engagement with the outer layer of particles, forming a corrugated or pebbled appearance on the outside of the support device, as shown in FIG. 9.

This deformation of the normally flat film material into a pebbled, dimpled configuration stretches each small segment of the film into a tight convex embrace surrounding the exposed peripheral portion of each juxtaposed particle of filler material thereunder, as shown in FIG. 20. Resulting tension in the film draws the entire envelope into a tightly shrink-fitted package surrounding the body of filler material, substantially reducing the overall length and width of the support device itself. Thick heavy sheets of rubber or plastic are not supple enough to conform in a pebbled configuration to the individual particles of filler material since the resilient sheet is too thick to be urged inward between these particles. For this reason it has been found that upon evacuation envelopes of these thin polymer films of polyurethane or similar stretchable materials produce tighter, smaller, more solid and more compactly rigidified support devices than do envelopes of thick sheet rubber or similar flexible materials.

The elastic memory of the stretchable and shrinkable polyurethane film in all longitudinal and lateral directions allows the envelope to spring back to its original shape and size immediately upon admission of atmosphere through the evacuation conduit, to return the support device to its collapsed form, enhancing the supple moldability of the device.

PREFERRED FILLER MATERIALS

The prior art patents suggest the use of solid filler materials such as solid polystyrene crystals or pellets produced by conventional pelletizing machines, or such other hard, solid materials as sand particles or steel shot. Faulconer's U.S. Pat. No. 2,749,910 specifies granular filler materials such as sharp irregular granules of vinyl plastic molding powder with irregular sharp edges to form the desired rigidified structure upon evacuation. German Auslegeschrift No. 1,215,869 recommends the use of styrofoam beads as filler material. None of these prior art patents teaches the preferred size, the preferred density or the preferred filled volume of the envelope which have now been discovered to be most effective.

Droplets of liquid polystyrene incorporating blowing agents are conventionally "expanded" by heat during their descent through a column of heated gas. The temperature and exposure time customarily determine the size and density of the resulting particles of styrofoam, with higher temperatures and longer exposure times producing larger particles of lower density.

Careful evaluation of the properties and characteristics of expanded polymer beads of a wide variety of sizes has led to the discovery that a relatively narrow range of bead densities, preferably falling between 1.00 and 2.00 pounds per cubic foot, corresponding to outside diameters ranging between 0.015 and 0.125 inches, produce the best immobilizing action. Average particle diameters ranging between 0.035 inches and 0.065 inches with a median particle size of approximately 0.050 inches have been found to produce superior rigidified immobilizing devices.

Furthermore, "shrinking" action of the thin polyurethane film envelope under the influence of atmospheric pressure is enhanced by the cooperation of the beads of expanded foam filler materials therewith in a most effective manner when less than half of the maximum internal volume of the envelope is filled with these beads of filler material. It has been found that between 25 and 50 percent of the maximum volume of the envelope, and preferably between 30 and 45 percent of this volume, should be filled with the beads of lightweight expanded foam particles for best results. This allows the remaining empty volume of the envelope to be used for molding manipulation of the device in its collapsed mode, facilitating the shrinking, interfitting, pebbled embrace of the outer layer of filler particles by the thin film envelope under the influence of atmospheric pressure upon evacuation. Expanded styrene beads falling within these specified ranges of densities and particle sizes produce the resilient deformable interfitting engagement illustrated in FIGS. 19 and 20 with great effectiveness, and the flattening of juxtaposed particles urged against each other by atmospheric pressure may be observed through the thin film envelope in the rigidified mode of these devices.

All of the immobilizers incorporating the principles of the present invention are extremely lightweight, ranging from a pound or less in overall weight for the limb immobilizers of the kinds shown in FIGS. 1-13 to only a few pounds in the case of the full body immobilizers such as the stretcher immobilizers of FIG. 24 and FIG. 25.

All of these immobilizers afford quick acting immobilization and rigidification, often requiring only 10 seconds or less for conversion from completely limp, collapsed, easily manipulated form into the cast-like rigidity of splints. The immobilizers of this invention avoid trauma by conforming precisely to the body or appendage without the pressure characteristic of inflatable pneumatic splints or the weight of plaster casts.

The immobilizers of this invention also permit breathing or ventilation of the immobilized area when they are provided with open cell foam padding of the kind shown in the padding ring 88 of the cervical collar 83 of FIG. 13. Instant access to the immobilized limb or body is provided by these immobilizers, which may be collapsed almost instantaneously with great convenience for emergency treatment, reshaping or refitting.

The vacuum formed immobilizers of the present invention are inexpensive and long wearing, being easily cleaned with mild detergent or soap and water for prompt drying and immediate reuse.

Certain types of magnetic rigidifiable immobilizers using enclosed bodies of iron filings rigidified by the application of electromagnetic force have been proposed in the past, such as those shown in Simjian Pat. No. 2,802,463, but the extremely heavy weight of such devices as well as the conventional vacuum formed immobilizers of the kind shown in Dickinson Pat. No. 3,214,497 contraindicate their use in many situations. By contrast, the extremely light weight and easily manipulated formability of the present immobilizers make them uniquely well adapted for use in both emergency field service, hospital service and home patient care.

Since the foregoing description and drawings are merely illustrative, the scope of the invention has been broadly stated herein and it should be liberally interpreted so as to obtain the benefit of all equivalents to which the invention is fairly entitled.

What is claimed is:

1. A lightweight immobilizer support device alternately convertible between a collapsed mode in which it is easily manipulated and formed to conform to the object to be supported and a rigidified support mode in which it retains a firm, solid shape immobilizing the object being supported, comprising:
   A. a lightweight, stretchable, elastic envelope formed of thin supple sheet material less than 0.014 inches thick surrounding and enclosing a central cavity,
   B. a large plurality of lightweight compressible particles of expanded polymer foam material having a density between 1.00 and 2.00 pounds per cubic foot loosely filling less than half of the volume of the central cavity, said particles having outside diameters falling substantially within a range between 0.015 inches and 0.125 inches,
   C. a foraminous distributor unit inside the cavity, and
   D. an evacuation conduit extending through the envelope and connecting the cavity through the distributor unit to the region outside the envelope,
   E. said envelope material being sufficiently supple to stretch interfittingly into the interstices between adjacent peripheral particles in the rigidified support mode of the device, whereby a vacuum source may be connected to the evacuation conduit for withdrawing air from inside the envelope to permit atmospheric pressure to deform the compressible particles by collapsing and stretching the flexible envelope, thus clamping the device in its rigidified support mode, and whereby atmospheric air may be readmitted to the interior of the envelope through the evacuation conduit and the porous distributor unit to convert the device from its rigidified support mode to its collapsed mode.

2. The support device defined in claim 1, wherein at least a portion of the compressible foam particles are each provided with a hollow central cavity, decreasing their weight and reducing their resistance to deformation as compared to similar particles not having at least one hollow central cavity.

3. The device of claim 1 wherein the majority of the compressible particles are substantially spherical and greater than 0.035 inches and less than 0.065 inches in diameter, while the foraminous distributor unit is provided with pores averaging less than 0.035 inches in diameter.

4. The support device defined in claim 1 wherein the thickness of the envelope sheet material falls within a range between 0.004 and 0.008 inches.

5. The support device defined in claim 4 wherein the envelope sheet material is formed of polyurethane film approximately 0.006 inches in thickness.

6. The support device of claim 1, further including retaining means attached to the envelope for securing the envelope juxtaposed to the object to be supported.

7. The support device of claim 6 wherein the retaining means comprises a waistband dimensioned to encircle a wearer's waist, positioning the envelope juxtaposed to the wearer's forearm, whereby a cast-sling assembly is formed.

8. The support device of claim 1, further including longitudinal reinforcing means forming supplemental support for the envelope.

9. The support device of claim 8, further including carrying loops operatively connected to the envelope juxtaposed to the reinforcing means.

10. The support device defined in claim 1 further including a support layer laminated to a portion of the envelope.

11. The device of claim 10 wherein the support layer comprises a panel of flexible expanded polymer foam.

12. The device of claim 10 wherein the support layer comprises a panel of thin, rigid support material.

13. The device of claim 1, further including in the evacuation conduit a spring-loaded valve to retain reduced evacuation pressure inside the envelope in the rigidified support mode of the device.

* * * * *